United States Patent [19]

Leach

[11] Patent Number: 4,981,660

[45] Date of Patent: Jan. 1, 1991

[54] SELECTIVE HYBRID $NO_x$ REDUCTION PROCESS

[76] Inventor: James T. Leach, 24921 Danamaple St., Dana Point, Calif. 92629

[21] Appl. No.: 267,555

[22] Filed: Nov. 7, 1988

[51] Int. Cl.⁵ .......................... C01B 21/00; B01J 8/00
[52] U.S. Cl. ..................................... 423/235; 423/239
[58] Field of Search .................. 423/235, 235 D, 239, 423/239 A

[56] References Cited

U.S. PATENT DOCUMENTS

| | | | |
|---|---|---|---|
| 3,900,554 | 8/1975 | Lyon | 423/235 |
| 4,351,811 | 9/1982 | Matsuda et al. | 423/235 |
| 4,732,743 | 3/1988 | Schmidt et al. | 423/235 |

FOREIGN PATENT DOCUMENTS

| | | | |
|---|---|---|---|
| 3608846 | 9/1987 | Fed. Rep. of Germany | 423/235 |
| 53-62773 | 6/1978 | Japan | 423/235 |

*Primary Examiner*—Gregory A. Heller

*Attorney, Agent, or Firm*—William W. Haefliger

[57] ABSTRACT

The method of removing NO and $NO_2$ from a stream of hydrocarbon combustion products at elevated temperature includes the steps:

(a) removing NO from the combustion products in a first zone, and removing NO and $NO_2$ from the combustion products in a second zone spaced downstream from the first zone, (b) the removal of NO at the first zone being effected by dispersing reagent ammonia or ammonia radical into the stream of combustion products to convert NO into $N_2$ and $H_2O$, and (c) the removal of NO and $NO_2$ at the second zone being effected by providing a catalyst for contacting the stream, the catalyst effecting conversion of NO and $NO_2$ to $N_2$ and $H_2O$.

A natural draft heater tower is typically employed to contain the two zones.

13 Claims, 1 Drawing Sheet

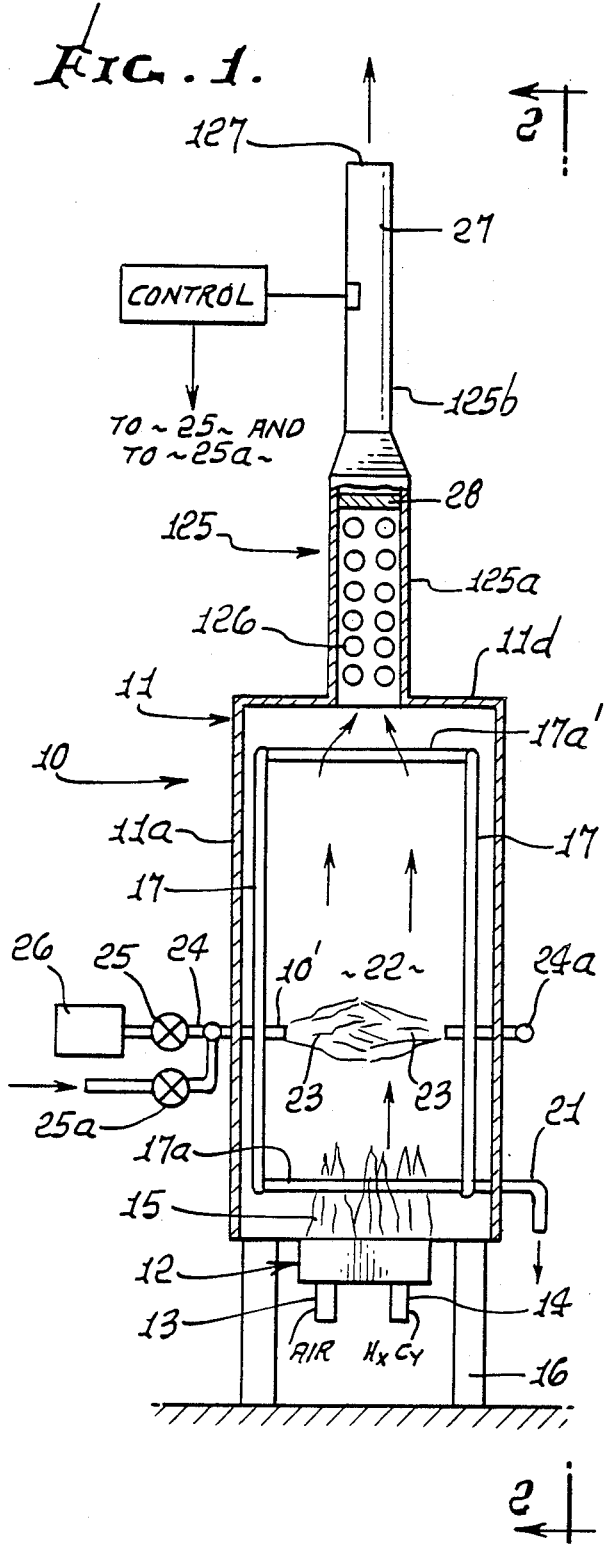
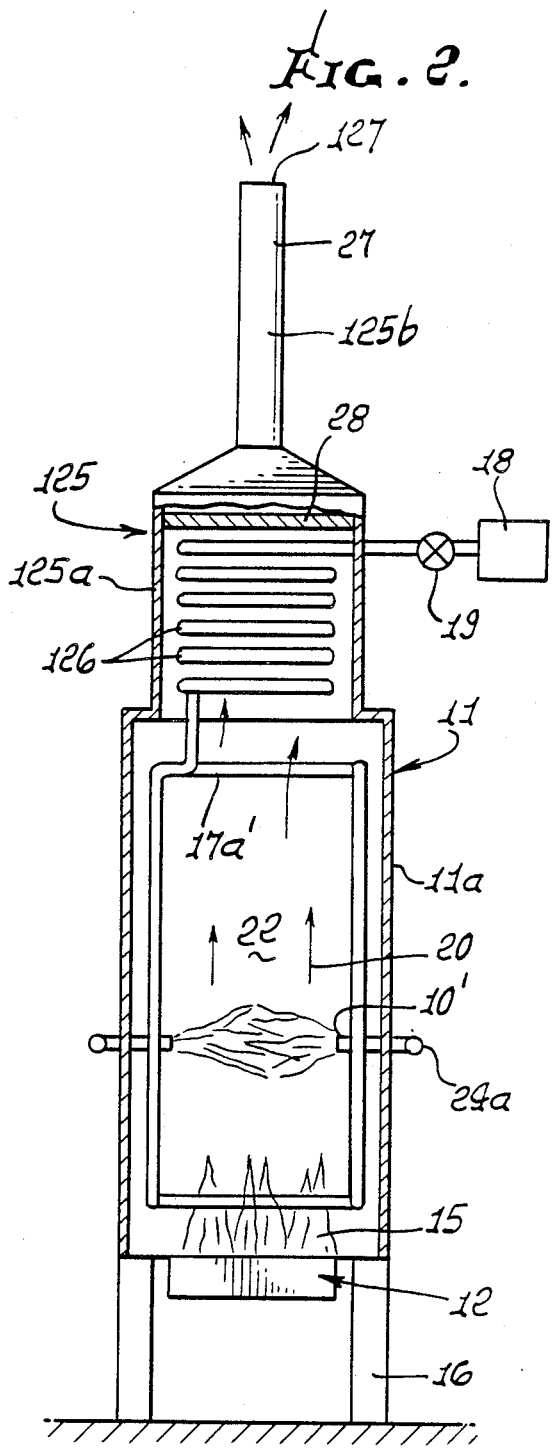

SELECTIVE HYBRID NO$_x$ REDUCTION PROCESS

BACK OF THE INVENTION

This invention relates generally to reduction or elimination of oxides of nitrogen from hot gases, as for example hot products of combustion; and more particularly it relates to a two-stage process for reducing the levels of such oxides in a gas stream.

The products of combustion of any hydrocarbon fuel always include a certain amount of a gaseous pollutant species known as NO$_x$, which is a mixture of nitric oxide NO, and nitrogen dioxide NO$_2$. The amount of the NO$_x$ produced, usually defined as its concentration in the gas stream, primarily depends upon the combustion flame temperature and the amount of oxygen available, and secondarily on the presence of organically bound nitrogen in the fuel. When discharged to the atmosphere, the NO$_x$ reacts with hydrocarbons in the air in the presence of sunlight to form oxidant, one of the principal components of smog in urban areas. The NO$_x$ also reacts to form nitric acid and thus contributes to the acid rain problem, and also reacts to form nitrates which contribute to the loss of visibility in the atmosphere. Because of these effects, the EPA, as well as the state and local pollution control agencies, have promulgated regulations that limit the emissions of NO$_x$ from a wide range of stationary emissions sources, such as boilers, furnaces, heaters, kilns, etc. With time, these limits have become increasingly restrictive because of the increasing rates or amounts of combustion of hydrocarbon fuels, and the growing smog, acid rain, and visibility problems.

Initially regulated NO$_x$ limits (beginning in the early 1970's) were such that the required levels could be met with any one of several so called combustion modifications. These included control of oxygen in the combustion, i.e. staging the combustion of such devices as overfire air ports and air lances, recirculation of flue gases, and newly developed low NO$_x$ burners, all of which could be equipment installed on a very cost effective basis.

Later, in the early 1980's, the regulated limits for NO$_x$ were further dropped by about 50 percent when a process was commercialized that is known as selective non catalytic reduction (SNCR) that could cost effectively achieve such reductions from the already lowered levels achieved with combustion modifications. This process, developed by the Exxon Corporation, involved the injection of ammonia into the combustion gas flow within a narrow temperature range, requiring a diluent gas to achieve the needed mixing with the combustion gas flow. The process has been commercially applied to a wide range of boilers and heaters.

Another process, selective catalytic reduction (SCR) was already developed and in limited service at the time of the introduction of SNCR. The SCR process also involved the injection of ammonia as a reactant, but required in addition the use of a considerable volume of expensive catalyst. The temperature range optimal for the catalytic reaction was considerably lower than that for the SNCR process. The SCR process had the capability of reducing the NO$_x$ emissions by about 80 to 90% from the levels achieved with combustion modifications; however the cost was significantly higher than that of SNCR, there were uncertainties about the life of the catalyst in many applications, as well as uncertainties as to the practicality of modifying many types of combustion equipment to its use. Thus the regulatory agencies were reluctant to mandate its use by setting the limits to the low levels achievable by SCR.

Over the period since the early 1980's, more experience has been gained regarding the use of SCR, and the need for further control has been exacerbated by the growing air quality crises in urban centers. Thus one of the control agencies that has been the most aggressive in forcing the application of new control technology, the South Coast Air Quality Management District (the Los Angeles basin), has recently passed regulations requiring reduction of No$_x$ emissions further, down to levels heretofore only achievable by the use of SCR. These regulations apply to wide variety and range of sizes of industrial stationary combustion equipment, and will shortly come into effect. Due to the press of the EPA for the SCAQMD to meet ambient air standard required by the Congressionally mandated Clean Air Act, these regulations were promulgated by the SCAQMD notwithstanding the fact that the SCR is still very expensive to install and to operate (requiring periodic replacement of catalyst), and notwithstanding the fact that its installation is very difficult to adapt to certain types of equipment because of pressure drop, and access to the proper temperature for the location of the catalyst.

Until recently, when catalytic burners were developed that could be applied to industrial combustion devices, there had been no alternatives to the use of SCR to achieve the newly mandated lower NO$_x$ emission levels. Unfortunately, such burners do not readily apply to all of the combustion devices which are subject to the new lower NO$_x$ levels, especially water tube boilers, vertical cylindrical natural draft refinery heaters, and other configurations of natural draft furnaces.

There is need for method and apparatus to overcome the above problems and difficulties, and to meet mandated very low NO$_x$ concentration levels in combustion gas effluents, or exhaust streams.

SUMMARY OF THE INVENTION

It is a major object of the invention to provide apparatus and method meeting the above need, and the subject of this invention addresses the need for a cost effective, readily adaptable, alternative SCR to achieve the lower NO$_x$ limits. The subject process invention, herein referred to as the Selective Hybrid NO$_x$ Reduction Process (SHR), is capable of achieving the newly required lower NO$_x$ levels. It involves the optimal synergistic combination of SNCR with SCR, utilizing much less catalyst than is normal for SCR, and thus significantly mitigating the problems of installation adaptability, cost, pressure drop or draft loss, and narrow temperature window requirements of a full SCR system.

The Selective Hybrid NO$_x$ reduction process (SHR) achieves cost-effective NO$_x$ control by optimally combining two existing and commercially proven technologies; the Selective Non-Catalytic NO$_x$ Reduction process (SNCR) and the Selective Catalytic NO$_x$ Reduction Process (SCR) with modifications. When these processes are combined to function as one improved process, and it is operated in a specific precisely controlled manner not normally employed for controlling either the SNCR or SCR processes, the improved process achieves a synergistic effect resulting in a greater level of NO$_x$ control achievable than experienced with control than experienced with the SCR process.

The prior SNCR process was developed by Exxon Research and Engineering Company in 1975. See U.S. Pat. No. 3,900,554. It relies on the homogeneous gas phase reaction of ammonia or ammonia compounds with NO at gas temperatures ranging from 1300° to 2000° F. No catalyst is employed in the SNCR process, and the SNCR process is only capable of controlling NO.

The prior SCR process achieves the selective reduction of NO and $NO_2$ by passing ammonia containing flue gas through a proprietary catalyst bed that converts the $NO_x$ to $N_2$ and $H_2O$.

In accordance with the present invention, the basic method for removing $NO_x$ from a stream of hydrocarbon combustion products at elevated temperature includes the steps:

(a) removing NO from the combustion products in a first zone, and removing NO and $NO_2$ from the combustion products in a second zone spaced downstream from said first zone, (b) the removal of NO at said first zone being effected by dispersing ammonia or ammonia radical into the stream of combustion products to convert NO into $N_2$ and $H_2O$, (c) the removal of NO and $NO_2$ at said second zone being effected by providing a catalyst for contacting the stream, the catalyst effecting conversion of NO and $NO_2$ to $N_2$ and $H_2O$.

As will be seen, the method is typically, but

As will be seen, the method is typically, but not necessarily, carried out in connection with boiler or heater apparatus incorporating a hydrocarbon fuel burner operating to produce said hot combustion products flowing to said zones. The process significantly and efficiently reduces the levels of both NO and $NO_2$ in the stream of such combustion products.

These and other objects and advantages of the invention, as well as the details of an illustrative embodiment, will be more fully understood from the following specification and drawings, in which:

DRAWING DESCRIPTION

FIG. 1 is an elevation showing heater apparatus incorporating the invention; and FIG. 2 is a section taken in elevation on lines 2—2 of FIG. 1.

DETAILED DESCRIPTION

In the drawings, heater apparatus 10 is shown, and may comprise a reactor or oil heater as usable in a refinery. Upright housing 11 includes a lower section 11a, associated with hydrocarbon fuel burners and windboxes designated at 12. The latter receive air and hydrocarbon fluid, as via lines 13 and 14 to produce burner flames at 15. Concrete piers 16 support the housing.

Located within the radiant section 11a of the housing are heat transfer tubes 17, to which process fluids are fed from a source 18 and via a valve 19 and heat transfer tubing 126 discussed below. The fluid is heated within the tubes 17, as by the hot combustion gases flowing upwardly at 20. Hot process fluid leaves the tubes and the housing at 21. The tubes 17 typically extend vertically about an open reaction zone 22 for heat absorption by radiation from hot gases flowing upwardly through the length of the housing. Tubing rings 17a and 17a' connect the tubes 17 at their lower and upper ends.

The hot combustion products at 20 normally contain both nitrogen oxide (NO) and nitrogen dioxide ($NO_2$).

Substantial NO is removed from the gases in a first zone 22, as a result of reaction with ammonia, or ammonia radical (as supplied by urea or other fluid) fed to that zone as a spray or slurry at 23, via supply tubing 24 and via tubing ring 24a and control valve 25, as from a source 26. See also injectors 10', extending from ring 24a through existing wall 11a. Valve 25 controls the rate of feed of the ammonia, or ammonia radical, for optimum removal of NO, the reaction at elevated temperatures (between 1,300° F. and 2,000° F., depending upon the temperature of the burner gases) and converting ammonia and NO to $H_2O$, $N_2$, $O_2$, and $N_2$. $O_2$ may also be injected with the ammonia, in amount reduced from 40% to 90%.

Remaining NO and the $NO_2$ content of the hot gases flow upwardly in the housing to and through a narrowed section 125 at the top 11d of the housing. The lower "convective" extent 125a of the stack contains additional heat transfer tubing 126 extending as seen in FIG. 2. Thus, the horizontal tubes 126 may be connected in series to deliver hot fluid to the tubes 17, via junction 21. The tubes 26 are spaced, and/or staggered, to be contacted by the hot gases entering and flowing upwardly in the stack lower extent 125a. Hot gases leave the stack 27 at 127.

Immediately above the tubes 126 is a porous catalyst bed 28, extending in a second zone across the interior of the stack section 25a, so that all of the hot gases containing $NO_2$ and remaining NO must pass through the bed. The bed may alternatively extend between the tubes 26 or in the base of stack 27. Removal of NO and $NO_2$ at the second zone is effected by contact with the catalyst, at elevated temperature (between 400° F. and 850° F.), the catalyst affecting conversion of NO and $NO_2$ to $N_2$ and $O_2$. As a result, the gases that reach and flow upwardly within the stack upper section 125b, to atmosphere, contain very low levels of NO and $NO_2$, i.e. no more than 30% of initial levels at 20. The process is not restricted to the type of combustion device or to the type of $NO_x$ reduction catalyst employed. The two most common types of catalysts employ either base-metal such as vanadium pentoxide, or platinum compounds.

Ammonia is injected into the flue gases upstream of the catalyst bed, where gas temperatures are between 1,300° F. and 2,000° F. As referred to, optimal gas temperatures for the process at the catalyst range from about 400° F. to 850° F., depending on catalyst type. The reagent is, generally, injected as shown to achieve a good reagent/$NO_x$ mixture for the first stage NO reduction prior to entrance of the gases into the catalyst. Also, an excess of reagent is injected to ensure optimal reduction of NO levels, while minimizing discharge of $NH_3$ at 127.

The improved process may be regarded as a two stage $NO_x$ reduction process involving the use of both SNCR and SCR technologies which are integrated, as will be seen.

Typically, NO molecules formed in the flame zone 15 are first reduced by the thermal process urea slurry (aqueous) or ammonia injection. A mixture of the selective NO reducing agent and any inert dispersant, such as air, steam, flue gas, or water, is typically injected into the gas stream, at gas temperatures at 20 ranging between 1,300° F. and 2,000° F. The injection is accomplished by injectors 10' which penetrate through the housing wall 11a' and extend between or inwardly past the process tubes 17 so as to avoid impingement on the tubes. Dispersant is employed to distribute the small concentration of reagent evenly and rapidly before the combustion gases can cool below the reaction temperature. The NO formed in the combustion process is reduced to the maximum extent commensurate with the amount of surplus reagent contained in the flue gases as they cool below the thermal reaction temperature. The amount of reagent injected is in excess of the amount injected in a pure SNCR process because the present SHR process relies on a surplus of reagent for further NO and $NO_2$ reduction in the second stage of the SHR process at the second or catalyst zone 28. The gases entering the catalyst 28 will contain unreacted NO and $NO_2$ from the SNCR stage, and excess reagent, in mole ratios optimal for maximum NO and $NO_2$ removal (conversion to $N_2$ and $O_2$) in the second stage. The optimal mole ratio of excess reagent to NO and $NO_2$ is a function of the type of catalyst used in and the gas temperature of the catalyst bed. The present SHR process is not specific to the type, configuration or composition of the reduction catalyst used, in order to retain the design flexibility to choose the most appropriate catalyst for each SHR application.

The combustion gases approaching the SCR zone 28 contain typically between 30% and 90% less $NO_x$ than the amount produced in the combustion process at 20, because of treatment by the SNCR process in stage one and they will contain the optimal concentration of excess reagent to achieve the maximum $NO_x$ reduction performance in stage 2, without the excess release of regeant beyond stage 2, and out the stack.

A feature of the present SHR process is that the $NO_x$ reduction at stage 1 greatly reduces the quantity of catalyst needed in stage 2 to achieve the desired lowered $NO_x$ concentration at the outlet, compared to a straight SCR process, alone. Such reduced quantity of catalyst effects proportionally less backpressure on the flow of combustion gases, and costs proportionally less to supply initially and to recharge. It also requires minimal or no alteration of the existing combustion device 10 and 11 for installation, and it presents a smaller spent catalyst disposal problem. The present SHR process requires typically from ¾ to 1/10 less catalyst material to achieve the same $NO_x$ control as a straight SCR process as referred to above.

The present SHR process also facilitates certain additional benefits over the SCR process for controlling $NO_x$ emissions. Specifically, the SHR process does not require an ammonia injection grid or any ammonia mixing device usually associated with SCR processes. In the present SHR process, the reagent is at least as well mixed at 128, just upstream of the catalyst, as it would be in any proprietary SCR process because of its injection and rapid turbulent mixing at 23 for good SNCR performance, followed by additional turbulent mixing caused by passage of the gas mixture around the combustion device's heat recovery surfaces between the SNCR stage and the SCR stage. This unsurpassed mixing of the reagent/$NO_x$ molecules prior to entering the second stage also ensures the maximum $NO_x$ reduction performance in the second stage and the minimum passage of unreacted reagent through the catalyst and out of the stack.

Elimination of the ammonia injection grid and mixing equipment associated with SCR processes reduces equipment cost, eliminates the associated backpressure on the combustion device, eliminates its associated space requirements, and greatly reduces the modifications to the combustion device necessary to install the injection and mixing equipment. These advantages of the present SHR process greatly improves the applicability and cost effectiveness of implementing high levels of $NO_x$ control on combustion equipment, because there is usually little space and draft available for pure SCR process equipment.

The SHR process also features certain advantages over the SNCR process. One advantage is superior $NO_x$ control capability. The SHR process can achieve up to three times the amount of $NO_x$ control as the SNCR process. Also, it causes substantially less unreacted reagent carryover and release out the stack. This advantage is significant, because regulatory authorities have become increasingly concerned about the quantity of reagent released into the atmosphere from SNCR process applications. The present SHR process reduces the undesirable release of unreacted reagent between 30% and 99% relative to SNCR produced levels.

The SHR process is also superior to the SNCR process because, while the SNCR process only reduces NO molecules, the SHR process reduces both NO and $NO_2$ molecules. Combustion devices such as heat recovery equipment for gas turbines have high ratios of $NO_2$ to NO and $NO_2$ in the gas stream. The SNCR process cannot provide effective total $NO_x$ control because it can reduce only the NO fraction. As is clear from the above, the SHR process will reduce both the NO molecules and the $NO_2$ molecules.

Optimal performance of the SHR process requires matching of the regeant injection location to the SNCR reaction temperature in the gasesin the combustion device first zone or stage. In some cases multiple rows of injectors are used to match the reagent injection to the proper gas temperatures. Multiple rows are sometimes needed in order to achieve reagent injection at the existent ga temperature which may move within the combustion device because of load changes, changes in excess air, or changes in burner selection in multiple burner devices.

The specific location of reagent injection is chosen based on one or more of the following parameters:

(a) firing rate of combustion device;
(b) excess air (or $O_2$) in combustion device;
(c) steam generation rate, process rate, process outlet temperature, or power generation rate;
(d) selection of burners;
(e) properties of process off gas streams burned in combustion device;
(f) gas temperature within the combustion device.

The objective of using these parameters is to achieve a reproducible and reliable relationship between the parameters and the location of the optimum gas temperature for maximum first stage $NO_x$ reduction.

The reagent injection rate (as via valve 25) for the SHR process is controlled separately from the selection of the injection location. The reagent rate is controlled by monitoring the outlet $NO_x$ concentration and/or the quantity of excess reagent in the stack gases (see sensor 35 operating a control 36 for the valves 25 and 25a), or, in cases where continuous $NO_x$ monitoring equipment is not available, the ammonia injection rate can be correlated to process load or firing rate either independently or in combination with excess oxygen concentration. The sensor could be placed between the two zones.

The reagent injection rate (moles of reagent to moles of uncontrolled $NO_x$) will be in excess of the rate normally employed for either the SNCR process or the SCR process because sufficient reagent must be available to reduce $NO_x$ at two locations. The range of mole ratio of reagent to inlet $NO_x$ concentration is 0.5 to 10.

Further, the level of NO and $NO_2$ in the stream after it passes through the second zone is between about 70% to 98% reduced from uncontrolled levels. And, the amount of ammonia or ammonia radical dispersed into the hot gas stream is such that the mole ratio of excess reagent to $NO_x$ leaving the first reaction zone is between 0.1 and 5.0.

Of substantial advantage is the fact that the invention is applicable to a natural draft heater, so that large draft inducing fans required to overcome the pressure drop through a large catalyst bed, are not needed. Accordingly, the bed thickness may be between about 3–6 inches only.

I claim:

1. The method of removing NO and $NO_2$ from a stream of hydrocarbon combustion products at elevated temperature, the steps that include
   (a) providing an upright housing forming a first zone and removing NO from the combustion products flow in said first zone, and providing a stack on the housing to form a second zone and removing NO and $NO_2$ from the combustion products flowing in said second zone spaced downstream from said first zone,
   (b) the removal of NO at said first zone being effected by dispersing sufficient reagent ammonia or ammonia radical into the stream of combustion products at stream temperature between 1,300° F. and 2,000° F. to convert NO into $N_2$ and $H_2O$, and to provide excess unreacted reagent dispersed in said stream and carried to the second zone,
   (c) the removal of NO and $NO_2$ at said second zone being effected by providing a catalyst for contacting the stream, the catalyst and excess reagent effecting conversion of NO and $NO_2$ to $N_2$ and $H_2O$ at stream temperatures between 400° F. and 850° F.
   (d) and providing first and second heat exchangers respectively in the housing and in the stack, in the flow paths of the hot combusting products, the heat exchangers operated to control said stream temperatures between 400° F. and 850° F. as aforesaid.

2. The method of claim 1 including providing apparatus including a hydrocarbon fuel burner operating to produce said hot combustion products flowing to said zones, there also being $O_2$ supplied to said zones.

3. The method of claim 1 wherein said heat exchanger in the second zone comprises a boiler having tubes, and including locating said second zone immediately downstream of said tubes.

4. The method of claim 1 wherein the level of NO and $NO_2$ in the steam is between 40% and 98% of initial level in the total stream, prior to dispersing ammonia or ammonia radical into the stream.

5. The method of claim 1 wherein the level of NO and $NO_2$ in the stream between said first and second zones is reduced by 30% to 90% of uncontrolled levels.

6. The method of claim 1 wherein the level of NO and $NO_2$ in the stream after it passes through the second zone is reduced by 40% to 95% from levels remaining in the gas stream after passage thereof through the first zone.

7. The method of claim 5 wherein the level of NO and $NO_2$ in the stream after it passes through the second zone is between about 70% to 98% reduced from the uncontrolled levels.

8. The method of claim 1 wherein the amount of ammonia or ammonia radical dispersed into the hot gas stream is such that the mole ratio of excess regeant to $NO_x$ leaving the first reaction zone is between 0.1 and 5.0.

9. The method of claim 1 wherein said ammonia radical is supplied by urea.

10. The method of claim 1 wherein the mole ratio of reagent to uncontrolled NO and $NO_2$ in the stream of combustion products is between 0.5 and 10.

11. The method of claim 1 including sensing the concentration of unreacted NO and $NO_2$ in the flow leaving the catalyst, and controlling the amount of said reagent dispersing to minimize NO and $NO_2$ in the stream leaving the second zone.

12. The method of claim 1 including sensing the concentration of unreacted reagent leaving the second zone, and particularly the amount of said reagent dispersing to prevent excessive release of the reagent in the stream leaving the second zone.

13. The method of claim 1 including flow of said stream through said zones by natural draft.

* * * * *